(12) United States Patent
Liang et al.

(10) Patent No.: US 10,640,700 B2
(45) Date of Patent: May 5, 2020

(54) HIGH TEMPERATURE CROSSLINKED FRACTURING FLUIDS

(71) Applicant: Saudi Arabian Oil Company, Dhahran (SA)

(72) Inventors: Feng Liang, Cyress, TX (US); B. Raghava Reddy, Pearland, TX (US); Leiming Li, Sugar Land, TX (US); Ghaithan A. Al-Muntasheri, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/134,625

(22) Filed: Sep. 18, 2018

(65) Prior Publication Data

US 2019/0016946 A1    Jan. 17, 2019

Related U.S. Application Data

(62) Division of application No. 15/366,928, filed on Dec. 1, 2016, now Pat. No. 10,144,866.

(60) Provisional application No. 62/262,250, filed on Dec. 2, 2015.

(51) Int. Cl.
| | |
|---|---|
| *C09K 8/62* | (2006.01) |
| *C09K 8/68* | (2006.01) |
| *C09K 8/88* | (2006.01) |
| *E21B 43/26* | (2006.01) |
| *C08F 220/56* | (2006.01) |
| *C09K 8/72* | (2006.01) |
| *C09K 8/74* | (2006.01) |

(52) U.S. Cl.
CPC ............ *C09K 8/685* (2013.01); *C08F 220/56* (2013.01); *C09K 8/725* (2013.01); *C09K 8/74* (2013.01); *C09K 8/887* (2013.01); *E21B 43/26* (2013.01); *C09K 2208/12* (2013.01); *C09K 2208/24* (2013.01); *C09K 2208/26* (2013.01)

(58) Field of Classification Search
CPC ......... E21B 43/26; E21B 43/16; E21B 43/20; E21B 43/25; E21B 37/00; E21B 21/062; E21B 21/01; E21B 33/124; E21B 36/003; E21B 43/006; E21B 43/02; E21B 43/025; C09K 8/035; C09K 8/68; C09K 8/62; C09K 8/52; C09K 8/80; C09K 8/12; C09K 8/42; C09K 8/70; C09K 8/64; C09K 8/90; C09K 8/588; C09K 8/76; C09K 8/512; C09K 8/34; C09K 8/74; C09K 8/82; C09K 8/44; C09K 8/50; C09K 8/72; C09K 8/88; C09K 8/03; C09K 8/36; C09K 8/40; C09K 8/508; C09K 8/516; C09K 8/60; C09K 8/56; C09K 8/58; C09K 8/584; C09K 8/92; C09K 8/032; C09K 8/04; C09K 8/08; C09K 8/426; C09K 8/502; C09K 8/514; C09K 8/54; C09K 8/86; C09K 8/10; C09K 8/206; C09K 8/32; C09K 8/38; C09K 8/46; C09K 8/487; C09K 8/518; C09K 8/84; C09K 8/94
See application file for complete search history.

(56) References Cited

U.S. PATENT DOCUMENTS

| | | | |
|---|---|---|---|
| 3,938,594 A | 2/1976 | Rhudy et al. | |
| 4,137,182 A | 1/1979 | Golinkin | |
| 5,007,481 A | 4/1991 | Williams et al. | |
| 5,256,315 A * | 10/1993 | Lockhart ............... | C08F 220/58 507/225 |
| 6,986,391 B2 | 1/2006 | Funkhouser et al. | |
| 8,309,498 B2 | 11/2012 | Funkhouser et al. | |
| 8,450,252 B2 | 5/2013 | Funkhouser et al. | |
| 2004/0211568 A1 * | 10/2004 | Funkhouser ............. | C09K 8/68 166/308.5 |
| 2010/0048430 A1 | 2/2010 | Funkhouser et al. | |
| 2012/0006551 A1 | 1/2012 | Carman et al. | |
| 2013/0118740 A1 * | 5/2013 | Sherman ............... | C09K 8/5083 166/279 |
| 2013/0118744 A1 * | 5/2013 | Gamage .................. | E21B 33/13 166/293 |

(Continued)

FOREIGN PATENT DOCUMENTS

| | | |
|---|---|---|
| AU | 2014278762 | 9/2015 |
| WO | WO2014/200611 | * 12/2014 |

(Continued)

OTHER PUBLICATIONS

Funkhouser et al., "Synthetic Polymer Fracturing Fluid for High-Temperature Applications," SPE 80236, Feb. 2003, 6 pages.

(Continued)

*Primary Examiner* — Kumar R Bhushan
(74) *Attorney, Agent, or Firm* — Fish & Richardson P.C.

(57) ABSTRACT

A fracturing fluid including a mixture of an aqueous copolymer composition including a copolymer, the copolymer having 2-acrylamido-2-methylpropanesulfonic acid, acrylamide, and acrylic acid monomer units, or a salt thereof, and a crosslinker. The crosslinker includes a metal, and the weight ratio of the metal to the copolymer is in a range of 0.01 to 0.08. Treating a subterranean formation includes introducing the fracturing fluid into a subterranean formation, and crosslinking the fracturing fluid in the subterranean formation to yield a crosslinked fracturing fluid. The crosslinked fracturing fluid has a viscosity of at least 500 cP for at least 80 minutes when the gel is subjected to a shear rate of 40 $s^{-1}$ at a temperature in a range of 300° F. to 400° F.

13 Claims, 3 Drawing Sheets

(56) References Cited

U.S. PATENT DOCUMENTS

2014/0367111 A1* 12/2014 Gamage ................. C09K 8/882
166/308.5
2016/0024367 A1* 1/2016 Zha .......................... C09K 8/64
166/308.2

FOREIGN PATENT DOCUMENTS

WO          2016/182553        11/2016
WO     WO2016/182553      * 11/2016

OTHER PUBLICATIONS

Gaillard et al., "Novel Associative Acrylamide-Based Polymers for Proppant Transport in Hydraulic Fracturing Fluids," SPE 164072, Apr. 2013, 11 pages.
Gupta et al., "Fracturing Fluid for Extreme Temperature Conditions is Just as Easy as the Rest," SPE 140176, Jan. 2011, 5 pages.
International Search Report and Written Opinion of the International Searching Authority issued in International Application No. PCT/US2016/064446 dated Mar. 17, 2017; 13 pages.
Gulf Cooperation Council Examination report issued in GCC Application No. GC 2016-32499 dated Jan. 3, 2019, 3 pages.
EPO Communication Pursuant to Article 94(3) EPC issued in European Application No. 16813278.5 dated Jan. 23, 2020, 6 pages.

* cited by examiner

HIGH TEMPERATURE CROSSLINKED FRACTURING FLUIDS

CROSS-REFERENCE TO RELATED APPLICATIONS

This application is a divisional application of and claims the benefit of priority to U.S. patent application Ser. No. 15/366,928, filed on Dec. 1, 2016, which claims priority to U.S. Provisional Application Ser. No. 62/262,250, filed on Dec. 2, 2015, which are incorporated by reference herein in their entirety.

TECHNICAL FIELD

This document relates to methods and compositions used in hydraulic fracturing operations, particularly those compatible with temperatures of up to 450° F. and higher.

BACKGROUND

Polysaccharide-based fluids such as guar fluids are commonly used in hydraulic fracturing operations, primarily because of their abundance, relative low cost, and capability to work at up to 350° F. when formulated at high pH (for example, greater than 9.5). One notable disadvantage, however, for most guar-based fracturing fluids is the insoluble residue in guar which tends to cause permeability reduction. Another disadvantage for using guar-based fluids at high pH is the tendency for forming divalent ion scales at high pH. In general, thermally stable synthetic polymers, such as acrylamide based polymers are considered to be residue-free. These polymers can be used for preparing fracturing fluids around 300-450° F. or more. However, a high dosage of acrylamide based polymers may still cause formation damage due to factors such as incomplete degradation.

SUMMARY

In a first general aspect, a fracturing fluid includes a mixture of an aqueous copolymer composition and a crosslinker. The aqueous copolymer composition includes a copolymer having 2-acrylamido-2-methylpropanesulfonic acid, acrylamide, and acrylic acid monomer units. The acrylic acid monomer units may be in the form of a salt of acrylic acid. The crosslinker includes a metal. In some cases, the crosslinker is presented in a water miscible non-aqueous solvent. A weight ratio of the metal to the copolymer is in a range of 0.01 to 0.08.

A second general aspect includes the fracturing fluid of the first general aspect, with the copolymer comprising 1 mol % to 55 mol % of the 2-acrylamido-2-methylpropanesulfonic acid monomer units, and the crosslinker present in an amount sufficient to yield a crosslinked fluid having a viscosity of at least 500 cP at a temperature of 300° F. and a pH less than 7.

In a third general aspect, treating a subterranean formation includes introducing the fracturing fluid of the first general aspect into the subterranean formation, and crosslinking the fracturing fluid in the subterranean formation to yield a crosslinked fracturing fluid.

Implementations of the first, second, and third general aspects may include one or more of the following features.

In some embodiments, the weight ratio of the metal to the copolymer is in a range of 0.02 to 0.06.

In some embodiments, the copolymer includes 1 mol % to 55 mol %, 1 mol % to 40 mol %, or 1 mol % to 25 mol % of the 2-acrylamido-2-methylpropanesulfonic acid monomer units. In certain embodiments, the copolymer is a terpolymer.

In some embodiments, the fracturing fluid includes at least one of a gel stabilizer, a clay stabilizer, a viscosity breaker, a proppant, and a pH adjusting agent. In one embodiment, the fracturing fluid includes a pH adjusting agent, and a pH of the fracturing fluid is in a range of 2 to 7 or 3 to 6.5. In some cases, the carrier fluid in the fracturing fluid may have between 50 mg/L and 50,000 mg/L of total dissolved solids. In certain cases, a concentration of the zirconium in the fracturing fluid is in a range of 0.001 wt % to 0.024 wt %. The fracturing fluid typically includes 20 to 50 pounds of the copolymer per thousand gallons of the fracturing fluid.

In some embodiments, after crosslinking, the fracturing fluid has a viscosity of at least 500 cP for at least 80 minutes when the gel is subjected to a shear rate of 40 $s^{-1}$ at a temperature in a range of 300° F. to 400° F. In some embodiments, the crosslinker includes a water-miscible, non-aqueous fluid. In some embodiments, the crosslinker includes zirconium, the fracturing fluid includes 25 pounds of the copolymer per thousand gallons of the fracturing fluid, a weight ratio of the zirconium to the copolymer is in a range of about 0.02 to about 0.04, the copolymer includes 15 wt % of the 2-acrylamido-2-methylpropane-sulfonic acid monomer units, and the crosslinked fracturing fluid maintains a viscosity of at least 500 cP for up to 180 minutes when the crosslinked fracturing fluid is subjected to a shear rate of 40 $s^{-1}$ at a temperature of 300° F. In certain embodiments, the crosslinked fracturing fluid includes a viscosity breaker and maintains a viscosity of at least 500 cP for up to 160 minutes and has a viscosity of less than 10 cP after 360 minutes when the crosslinked fracturing fluid is subjected to a shear rate of 40 $s^{-1}$ at a temperature of 300° F.

In some embodiments, the crosslinker includes zirconium, the fracturing fluid includes 20 pounds of the copolymer per thousand gallons of the fracturing fluid, a weight ratio of the zirconium to the copolymer is in a range of about 0.02 to about 0.04, and the crosslinked fracturing fluid maintains a viscosity of at least 500 cP for up to 180 minutes when the crosslinked fracturing fluid is subjected to a shear rate of 40 $s^{-1}$ at a temperature of 300° F.

In some embodiments, the crosslinker includes zirconium, the fracturing fluid includes 30 pounds of the copolymer per thousand gallons of the fracturing fluid, a weight ratio of the zirconium to the copolymer is in a range of about 0.02 to about 0.04, and the crosslinked fracturing fluid maintains a viscosity of at least 500 cP for up to 80 minutes when the crosslinked fracturing fluid is subjected to a shear rate of 40 $s^{-1}$ at a temperature of 400° F.

Advantages of the first, second, and third general aspects include a low level of 2-acryl-amido-2-methylpropane-sulfonic acid monomer units in the copolymer, low copolymer loadings in the fracturing fluids, low crosslinker to copolymer ratios, and rapid viscosity reduction via viscosity breakers in the presence of the crosslinked fracturing fluids.

DETAILED DESCRIPTION

Figure 1:
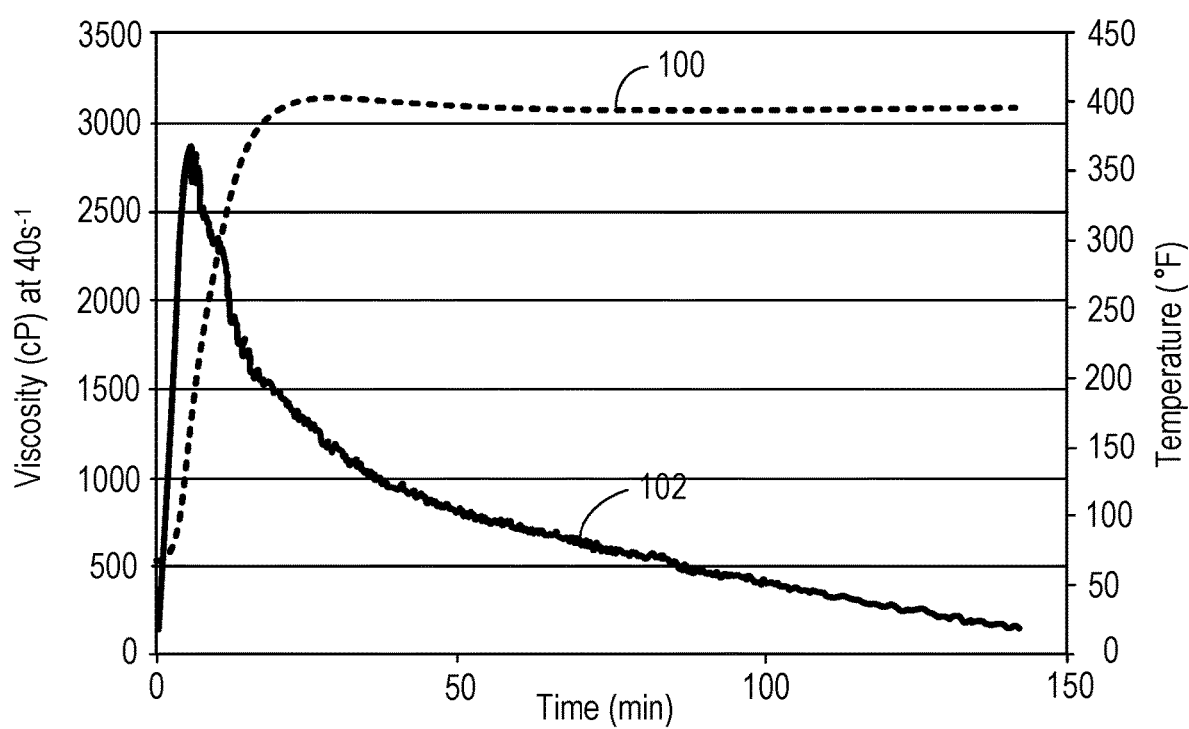
FIG. 1 shows a plot of viscosity versus time for an exemplary crosslinked fracturing fluid.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used herein, the term "polymer" refers to a molecule having at least one repeating unit and can include copolymers.

The term "copolymer" as used herein refers to a polymer that includes at least two different repeating units. A copolymer can include any suitable number of repeating units.

As used herein, the term "fracturing fluid" refers to fluids or slurries used downhole during hydraulic fracturing operations.

As used herein, the term "fluid" refers to gases, liquids, gels, slurries with a high solids content, and critical and supercritical materials.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, water control, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Crosslinked Fracturing Fluid Systems & Compositions

Provided in this document are fracturing fluids and crosslinked fracturing fluids. The fracturing fluids include an aqueous composition including a copolymer and a crosslinking solution including a crosslinker. The crosslinked fracturing fluids include a crosslinked product of the copolymer and the crosslinker.

In some cases, the copolymer includes at least three monomer units: 2-acrylamido-2-methylpropanesulfonic acid (AMPSA), acrylamide, and acrylic acid or a related salt thereof. The copolymer typically has less than 55 mol % of AMPSA. In some cases, the copolymer has less than 20 mol % AMPSA. In some cases, the copolymer has between 1 mol % and 55 mol %, between 1 mol % and 40 mol %, between 1 mol % and 25 mol %, between 10 mol % and 30 mol %, between 12 mol % and 20 mol %, or between 13 mol % and 17 mol % AMPSA. In some cases, the copolymer has about 1 mol %, 5 mol %, 10 mol %, 20%, 25 mol %, 30 mol %, 35 mol %, 40 mol %, 45 mol %, 50 mol %, or 55 mol % AMPSA. The copolymer can also have about 15 mol % of the AMPSA. The copolymer can have about 0.1 mol % to about 30 mol % of acrylic acid. In some cases, the copolymer is a terpolymer including AMPSA, acrylamide, and acrylic acid or a related salt thereof. The terpolymer has less than 55 mol % AMPSA. In some cases, the terpolymer has less than 20 mol % AMPSA. In some cases, the terpolymer has between 5 mol % and 40 mol %, between 10 mol % and 30 mol %, between 12 mol % and 20 mol %, or between 13 mol % and 17 mol % AMPSA. In some cases, the terpolymer has about 5 mol %, 10 mol %, 20%, 25 mol %, 30 mol %, 35 mol %, 40 mol %, 45 mol %, 50 mol %, or 55 mol % AMPSA. The terpolymer can also have about 15 mol % AMPSA. The terpolymer can have about 0.1 mol % to about 30 mol % of acrylic acid. In an embodiment, the amount of acrylic acid is greater than 0 mol %.

The copolymers provided herein can be combined with crosslinkers to produce crosslinked fluids that function as efficient proppant transportation fluids at low polymer loadings. For example, it has been discovered that a fracturing fluid having a copolymer concentration of less than 30 pounds per thousand gallons (pptg) can produce crosslinked fluids when combined with a crosslinker, even at a low crosslinker/copolymer ratio for use at 450° F. or higher. In some cases, a fracturing fluid has a copolymer in a concentration of less than 50 pptg, less than 35 pptg, less than 30 pptg, less than 25 pptg, or less than 20 pptg. In some cases, a fracturing fluid includes a copolymer in a concentration between 10 and 40 pptg, between 15 and 35 pptg, or between 20 and 30 pptg. In some cases, a fracturing fluid includes a copolymer in a concentration of about 10 pptg, 15 pptg, 20 pptg, 25 pptg, 30 pptg, 35 pptg, 40 pptg, 45 pptg, or 50 pptg. For example, for a 400° F. application, a fracturing fluid including a copolymer at a concentration of about 30 pptg, can be used. For example, for a 300° F. application, a fracturing fluid including a copolymer at a concentration of about 20 pptg can be used.

A terpolymer of AMPSA, acrylamide, and acrylic acid or a related salt thereof may be obtained by copolymerizing AMPSA, acrylic acid and acrylamide in specified amounts. The terpolymer can also be produced by initially polymerizing AMPSA and acrylamide, and hydrolyzing the acrylamide to generate desired amounts of acrylic acid, such that the number of moles of acrylamide and acrylic acid monomer units is equal to total number of moles of acrylamide initially employed. The copolymer can be employed as water-in-oil emulsion or suspension concentrate, or as a solid dissolved in an aqueous fluid.

Fracturing fluids provided herein can include low ratios of crosslinker to copolymer. Suitable crosslinkers typically include a metal. In some cases, the crosslinker includes zirconium. Suitable zirconium crosslinkers include by non-limiting example, zirconium complexes in which zirconium is complexed with ligands such as lactate salts (for example, sodium zirconium lactate), triethanolamines, alkoxides (for example, isopropoxide and propoxide), 2,2'-iminodiethanol, and mixtures of these ligands. The crosslinker may be suitably dissolved in aqueous fluids, non-aqueous fluids or liquids (for example, alcohol such as n-propanol), and the combination of aqueous, water-miscible non-aqueous solvents (for example, alcohols and aminoalcohols). TYZOR 212, available from Dorf Ketal as a solution in n-propanol, is one example of a Zr crosslinker. When 20 pptg to 30 pptg of the copolymer is present in the fracturing fluid and the crosslinking solution is TYZOR 212, a weight ratio of Zr to copolymer may be in a range of about 0.01 to about 0.08 (such as about 0.02 to about 0.06 or about 0.02 to about 0.04), and a weight percentage of Zr in the fracturing fluid may be in a range of about 0.001 wt % to about 0.024 wt %. Crosslinkers suitable for fracturing fluid may also include titanium (Ti) crosslinkers. Suitable titanate crosslinkers include, by non-limiting example, titanate crosslinkers with ligands such as lactates and triethanolamines, and mixtures thereof, optionally delayed with hydroxyacetic acid. Crosslinkers suitable for fracturing fluid may also include aluminum (Al) crosslinkers, chromium (Cr) crosslinkers, iron (Fe) crosslinkers, hafnium (Hf) crosslinkers, and combinations thereof. In some cases, a crosslinking solution including about 7 wt % to about 20 wt % of a metal crosslinker can be present at a concentration of about 0.1 gpt to about 5.0 gpt, about 0.5 gpt to about 1.5 gpt, or about 0.9 to about 1.1 gpt of the fracturing fluid.

Fracturing fluids provided herein have a similar or better gel thermal stability as compared to other fracturing fluids including copolymers having a higher mol % of AMPSA and/or having higher copolymer loadings. In some cases, fracturing fluids described herein with a 25 pptg copolymer loading maintain a viscosity of at least 500 cP for 20 to 180 minutes when subjected to a 40 $s^{-1}$ shear rate at a temperature of 300° F. In some cases, fracturing fluids described herein with a 20 pptg copolymer loading maintain a viscosity of at least 500 cP for 40 to 180 minutes when the fluid system is subjected to a 40 $s^{-1}$ shear rate at a temperature of 300° F. In some cases, fracturing fluids provided herein with a 30 pptg copolymer loading maintain a viscosity of at least 500 cP for 50 to 80 minutes when the fluid system is subjected to a 40 $s^{-1}$ shear rate at a temperature of 400° F. These fracturing fluids can provide sufficient time for proppant transportation.

Fracturing fluids provided herein can be used at temperatures between 300° F. and 450° F. or higher, and typically have a pH in a range of 5 to 7 or 5.5 to 6.5. Additionally, a high crosslinker concentration is not required, thereby further reducing the costs associated with the fracturing fluid.

In some cases, fracturing fluids provided herein are formed by mixing a copolymer provided herein with an aqueous carrier, such as water. The aqueous carrier can include water, fresh water, brine, produced water, flowback water, brackish water, Arab-D-brine, sea water, or combinations thereof. In some cases, the water is field water. In some cases, the field water has less than 50,000 mg/L of total dissolved solids (TDS). In some cases, the field water has between 500 and 20,000 mg/L TDS, between 700 and 10,000 mg/L TDS, between 800 and 2000 mg/L TDS, or between 1,000 and 1,500 mg/L TDS. In some cases, the field water has about 500 mg/L TDS, 600 mg/L TDS, 700 mg/L TDS, 800 mg/L TDS, 900 mg/L TDS, 1,000 mg/L TDS, 1,200 mg/L TDS, 1,400 mg/L TDS, 2,000 mg/L TDS, 5,000 mg/L TDS, 10,000 mg/L TDS, 20,000 mg/L TDS, or about 50,000 mg/L TDS.

In some cases, the fracturing fluid includes at least one of a gel stabilizer, clay stabilizer, or other suitable additive. In some cases, the gel stabilizer includes an antioxidant. In some cases, the gel stabilizer includes phenols, polyphenols, di-tertbutyl alkyl phenols, hydroquinone, apigenin, resveratrol, ascorbic acid, tocopherol, sodium bisulfate, sodium hydrogen sulfite, sodium thiosulfate, ammonium thiosulfate, thiourea, or a combination thereof. In some cases, the clay stabilizer includes sodium chloride, potassium chloride, ammonia chloride, tetramethylammonium chloride (TMAC), other quaternary molecules, or a combination thereof. In some cases, bromides, such as sodium bromide or potassium bromide, is included.

In some cases, the fracturing fluid includes a pH adjusting agent. For example, the fracturing fluid can include an acetic acid solution, an acetic acid/acetate buffer solution, or hydrochloric acid. In some cases, an acid is added to a fracturing fluid to achieve a pH between about 2 and 7, 3 and 6.5, and 5 and 5.5, or between about 5 and 7 or 5.5 and 6.5.

In some cases, a fracturing fluid includes a copolymer, a crosslinker, a gel stabilizer, and a clay stabilizer. The copolymer includes acrylamide, acrylic acid, and about 15 mol % AMPSA. The crosslinker is in the form of a crosslinking solution including about 12.4 wt % Zr. In some cases, the copolymer is present at a concentration of about 30 pptg, the crosslinking solution is present at a concentration of about 0.9 gpt, the gel stabilizer is present as a gel stabilizer solution at a concentration of about 3.0 gpt, and the clay stabilizer is present as a clay stabilizer solution at a concentration of about 2 gpt. In some cases, the copolymer is present at a concentration of about 25 pptg, the crosslinking solution is present at a concentration of about 0.9 gpt, the gel stabilizer is present at a concentration of about 0.5 gpt, and the clay stabilizer is present at a concentration of about 2 gpt. In some cases, the copolymer is present at a concentration of about 20 pptg, the crosslinking solution is present at a concentration of about 1.1 gpt, the gel stabilizer is present at a concentration of about 0.4 gpt, and the clay stabilizer is present at a concentration of about 2 gpt.

In some cases, a fracturing fluid includes a terpolymer, a crosslinker, a gel stabilizer, and a clay stabilizer. The terpolymer includes acrylamide, acrylic acid, and about 15 mol % of AMPSA. The crosslinker is in the form of a crosslinking solution including about 12.4 wt % Zr. In some cases, the terpolymer is present at a concentration of about 30 pptg, the crosslinker is present at a concentration of about 0.9 gpt, the gel stabilizer is present at a concentration of about 3.0 gpt, and the clay stabilizer is present at a concentration of about 2 gpt. In some cases, the terpolymer is present at a concentration of about 25 pptg, the crosslinking solution is present at a concentration of about 0.9 gpt, the gel stabilizer is present at a concentration of about 0.5 gpt, and the clay stabilizer is present at a concentration of about 2 gpt. In some cases, the terpolymer is present at a concentration of about 20 pptg, the crosslinker is present at a concentration of about 1.1 gpt, the gel stabilizer is present at a concentration of about 0.4 gpt, and the clay stabilizer is present at a concentration of about 2 gpt.

In one embodiment, a fracturing fluid includes a crosslinker including a metal and an aqueous copolymer composition including a copolymer, the copolymer comprising 2-acryl-amido-2-methylpropanesulfonic acid, acrylamide, and acrylic acid monomer units, or a salt thereof. The copolymer may include 1 mol % to 55 mol % of the 2-acrylamido-2-methylpropane-sulfonic acid monomer units. The weight ratio of the metal to the copolymer is in a range of 0.01 to 0.08. The pH of the fracturing fluid may be in a range of about 5 to about 7, or about 5.5 to about 6.5. In one embodiment, the crosslinker is present in an amount sufficient to yield a crosslinked fluid having a viscosity of at least 500 cP at a temperature of 300° F. and a pH of 6.5.

In some cases, a fracturing fluid includes a proppant. Examples of proppants include sand, gravel, glass beads, polymer beads, ground products from shells and seeds (such as walnut hulls), and manmade materials (such as ceramic proppant, bauxite, tetrafluoroethylene materials), fruit pit materials, processed wood, composite particulates prepared from a binder, and fine grade particulates such as silica, alumina, fumed silica, carbon black, graphite, mica, titanium dioxide, meta-silicate, calcium silicate, kaolin, talc, zirconia, boron, fly ash, hollow glass microspheres, solid glass, or a combination thereof.

EXPERIMENTAL

Chemicals:

M1—The terpolymer used in the below examples is in a water-in-oil emulsion form (30% active) containing 15 mol % of 2-acrylamido-2-methylpropanesulfonic acid (AMPSA), 5 mol % of acrylic acid (AA), and 80 mol % acrylamide (AM).

M2—20% acetic acid solution; M2'-acetic acid/acetate buffer solution.

M3—Zr crosslinker (TYZOR 212, with 16.75 wt % $ZrO_2$ and 12.4 wt % Zr).

M4—gel stabilizer (CELB 225-010-2, available from ChemEOR).

M5—clay stabilizer, 50% tetramethylammonium chloride (TMAC) (PACS-150L available from Precision Additives).

Example 1

In the first example, a fracturing fluid including synthetic field water (TDS of about 1200 mg/L), 30 pptg terpolymer (M1), 1.9 gpt 20% acetic acid solution (M2), 4 gpt gel stabilizer (M4), 2 gpt clay stabilizer (M5, 50% TMAC), and 0.8 gpt of Zr crosslinker (M3, with 12.4 wt % Zr) was prepared. The pH of the mixed fluid was 5.4. The weight ratio of Zr to terpolymer M1 was about 0.03. Viscosity of the resulting crosslinked fracturing fluid at a shear rate of 40 s$^{-1}$ was measured at 400° F. Plot 100 in FIG. 1 shows temperature versus time, and plot 102 shows viscosity versus time for the crosslinked fracturing fluid. The fracturing fluid maintained a viscosity of over 500 cP at a shear rate of 40 s$^{-1}$ for 87 min.

Example 2

Figure 2:
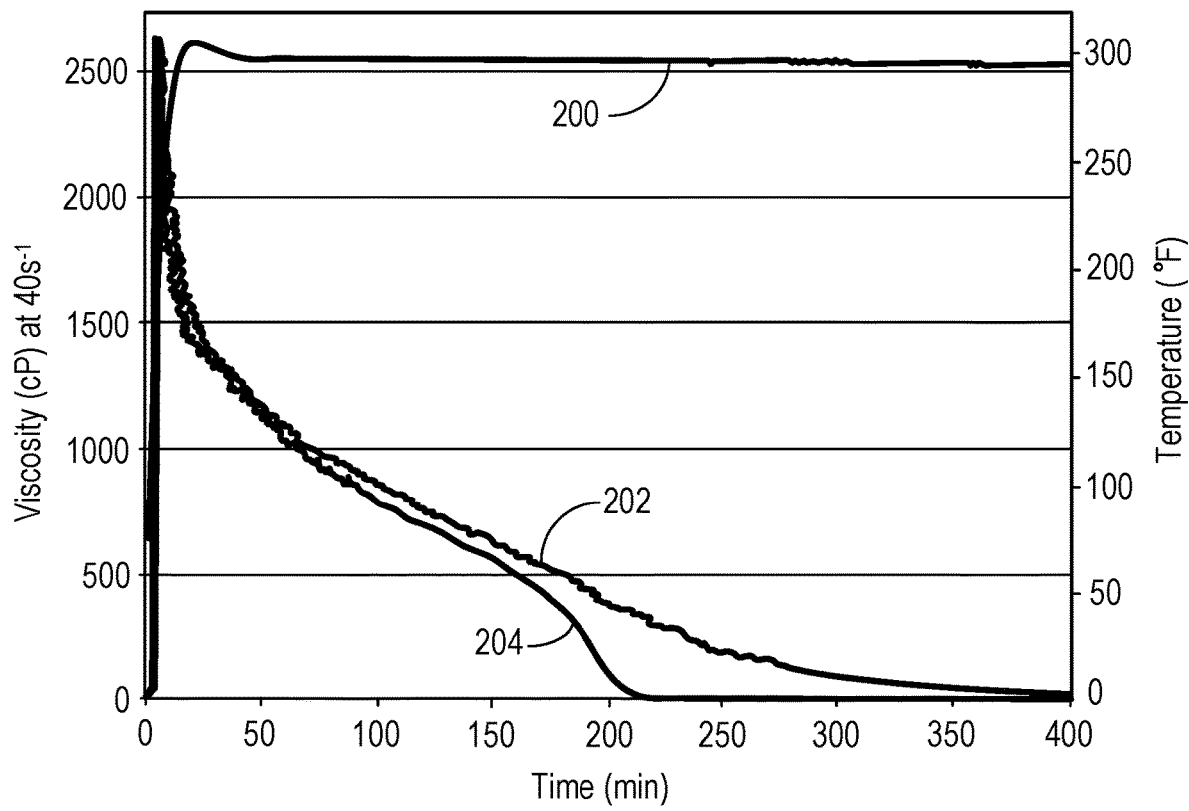
FIG. 2 shows a plot of viscosity versus time for an exemplary crosslinked fracturing fluid with and without a viscosity breaker.

In the second example, a fracturing fluid including synthetic field water (TDS of about 1200 mg/L), 25 pptg terpolymer (M1), 3.5 gpt 20% acetic acid/acetate buffer solution (M2'), 0.5 gpt gel stabilizer (M4), 2 gpt clay stabilizer (M5), and 0.5 gpt of Zr crosslinker M3 (with 12.4 wt % Zr) was prepared. The pH of the mixed fluid was 5.4. The weight ratio of Zr to terpolymer M1 was about 0.02. Viscosity of the resulting crosslinked fracturing fluid at a shear rate of 40 s$^{-1}$ was measured at 300° F. Plot 200 in FIG. 2 shows temperature versus time. Plot 202 shows viscosity versus time for the crosslinked fracturing fluid in the absence of a viscosity breaker. Plot 204 shows viscosity versus time for the crosslinked fracturing fluid with 4 pptg encapsulated sodium bromate (e.g., about 70 wt % sodium bromate, the balance coating) as a viscosity breaker. The crosslinked fracturing fluid with viscosity breaker maintained a viscosity of over 500 cP at a shear rate of 40 s$^{-1}$ for a duration of 160 min. After 6 hours, the viscosity of the broken fluid was below 10 cP, indicating that encapsulated sodium bromate is capable of breaking the fracturing fluid.

It was found that the crosslinked fracturing fluid is capable of suspending proppant, and that the broken fluid does not contain gel residue.

Example 3

Figure 3:
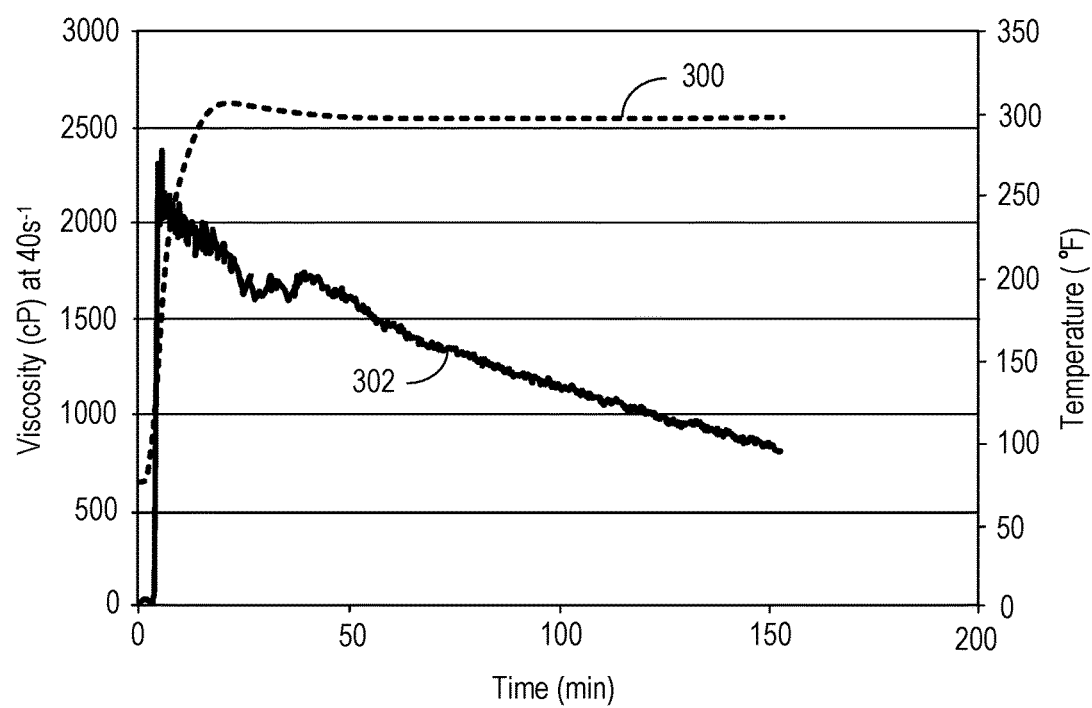
FIG. 3 shows a plot of viscosity versus time for an exemplary crosslinked fracturing fluid.

In the third example, a fracturing fluid including synthetic field water (TDS of about 1200 mg/L), 20 pptg terpolymer (M1), 3 gpt 20% acetic acid/acetate buffer solution (M2'), 1 gpt gel stabilizer (M4), 2 gpt clay stabilizer (M5), 0.5 gpt Zr crosslinker (M3, with 12.4 wt % Zr) was prepared. The pH of the mixed fluid was 5.6. The weight ratio of Zr to terpolymer M1 was about 0.028. Viscosity of the resulting crosslinked fracturing fluid at a shear rate of 40 s$^{-1}$ was measured at 300° F. Plot 300 in FIG. 3 shows temperature versus time. Plot 302 shows viscosity versus time for the crosslinked fracturing fluid. The fracturing fluid maintained a viscosity of over 500 cP at a shear rate of 40 s$^{-1}$ for over 2.5 hours.

These results indicate that a crosslinked fracturing fluid having a terpolymer with acrylamide, acrylic acid, and less than 15 mol % AMPSA can be employed at low copolymer concentration (e.g., 20 to 30 pptg) at temperatures from 300° F. to 400° F. The results from rheological studies demonstrate superior crosslinking performance and thermal stability of fracturing fluids with low copolymer loading in this temperature range. These fracturing fluids have sufficient proppant carrying viscosity, allow for efficient cleanup using an oxidizer type breaker, and facilitate efficient cleanup, reduced formation damage, better fluid conductivity, and enhanced production rates.

Other Embodiments

It is to be understood that while embodiments have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A fracturing fluid comprising a mixture of:
   an aqueous copolymer composition comprising a copolymer, the copolymer comprising 2-acrylamido-2-methylpropanesulfonic acid, acrylamide, and acrylic acid monomer units, wherein the copolymer comprises 1 mol % to 25 mol % of the 2-acrylamido-2-methylpropanesulfonic acid monomer units; and
   a crosslinker comprising a metal, wherein a weight ratio of the metal to the copolymer is in a range of 0.01 to 0.08, wherein the fracturing fluid comprises 20 to 50 pounds of the copolymer per thousand gallons of the fracturing fluid, and wherein the fracturing fluid comprises a crosslinked fracturing fluid having a viscosity of at least 500 centipoise (cP) at a temperature in a range of 300° F. to 400° F. for at least 80 minutes at a shear rate of 40 s$^{-1}$.

2. The fracturing fluid of claim 1, wherein the weight ratio of the metal to the copolymer is in a range of 0.02 to 0.06, wherein the fracturing fluid comprises 20 to 30 pounds of the copolymer per thousand gallons of the fracturing fluid, and wherein the copolymer comprises 5 mol % to 15 mol % of the 2-acrylamido-2-methylpropanesulfonic acid monomer units.

3. The fracturing fluid of claim 1, comprising at least one of a gel stabilizer, a clay stabilizer, a viscosity breaker, a proppant, and a pH adjusting agent.

4. The fracturing fluid of claim 3, comprising the pH adjusting agent, wherein a pH of the fracturing fluid is in a range of 2 to 7 or 3 to 6.5.

5. The fracturing fluid of claim 1, comprising between 50 mg/L and 50,000 mg/L of total dissolved solids.

6. The fracturing fluid of claim 1, wherein a concentration of the metal in the fracturing fluid is in a range of 0.001 wt % to 0.024 wt %.

7. The fracturing fluid of claim 1, wherein the fracturing fluid comprises a pH of at least 6.5.

8. A fracturing fluid comprising a mixture of:
   an aqueous copolymer composition comprising a copolymer, the copolymer comprising 2-acrylamido-2-methylpropanesulfonic acid, acrylamide, and acrylic acid monomer units, and wherein the copolymer comprises 1 mol % to 25 mol % of the 2-acrylamido-2-methylpropanesulfonic acid monomer units, wherein the fracturing fluid comprises 20 to 50 pounds of the copolymer per thousand gallons of the fracturing fluid, and wherein the fracturing fluid comprises a pH less than 7; and
   a crosslinker comprising a metal, wherein a weight ratio of the metal to the copolymer is in a range of 0.01 to 0.08, and wherein the fracturing fluid comprises a crosslinked fluid having a viscosity of at least 500 cP at 300° F. for at least 80 minutes at a shear rate of 40 s$^{-1}$.

9. The fracturing fluid of claim 8, wherein the crosslinker comprises a water-miscible, non-aqueous fluid.

10. The fracturing fluid of claim 8, wherein the weight ratio of the metal to the copolymer is in a range of 0.02 to 0.06.

11. The fracturing fluid of claim 8, wherein a concentration of the metal in the fracturing fluid is in a range of 0.001 wt % to 0.024 wt %.

12. The fracturing fluid of claim 8, wherein the fracturing fluid comprises 20 to 30 pounds of the copolymer per thousand gallons of the fracturing fluid, and wherein the copolymer comprises 5 mol % to 15 mol % of the 2-acrylamido-2-methylpropanesulfonic acid monomer units.

13. The fracturing fluid of claim 8, wherein a pH of the fracturing fluid is in a range of 6.5 to 7.

* * * * *